(12) United States Patent
Chuang et al.

(10) Patent No.: US 8,339,525 B2
(45) Date of Patent: Dec. 25, 2012

(54) PROJECTION DEVICE WITH BRIGHTNESS ADJUSTMENT FUNCTION AND METHOD THEREOF

(75) Inventors: Ping-Yang Chuang, Taipei Hsien (TW); Ying-Chuan Yu, Taipei Hsien (TW); Ying-Xiong Huang, Taipei Hsien (TW); Hsing-Chu Wu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 207 days.

(21) Appl. No.: 12/981,565

(22) Filed: Dec. 30, 2010

(65) Prior Publication Data

US 2012/0120329 A1    May 17, 2012

(30) Foreign Application Priority Data

Nov. 15, 2010    (TW) .................................. 99139203

(51) Int. Cl.
G02F 1/1335    (2006.01)
(52) U.S. Cl. ......................................................... 349/5
(58) Field of Classification Search ........................ None
See application file for complete search history.

(56) References Cited

U.S. PATENT DOCUMENTS

| | | | |
|---|---|---|---|
| 7,905,605 B2 * | 3/2011 | Bierhuizen et al. | 353/31 |
| 2004/0080677 A1 * | 4/2004 | Kamei | 349/5 |
| 2011/0115992 A1 * | 5/2011 | Maeda et al. | 349/5 |
| 2011/0292307 A1 * | 12/2011 | Yagi | 349/8 |

FOREIGN PATENT DOCUMENTS

| | | |
|---|---|---|
| EP | 1223766 B1 | 10/2004 |
| JP | 2007-79402 A | 3/2007 |

* cited by examiner

*Primary Examiner* — Sung Pak
(74) *Attorney, Agent, or Firm* — Altis Law Group, Inc.

(57) ABSTRACT

A projection device with a brightness adjustment function includes a polarization beam splitter (PBS), a light source, a reflective display, a lens module, a power supply unit, a light detection unit and a power controller. The light source emits light to the PBS. The PBS reflects a portion of the light to the reflective display, and transmits a remaining portion of the light. The lens module projects the images. The light detection unit acquires a digital value of a portion of the light reflected by the PBS that is not received by the reflective display, and compares the digital value with a predetermined digital value to generate a control signal. The power controller for adjusts power from the power supply unit to the light source according to the control signal until the digital value matches the predetermined digital value of the light from the light source.

7 Claims, 3 Drawing Sheets

PROJECTION DEVICE WITH BRIGHTNESS ADJUSTMENT FUNCTION AND METHOD THEREOF

BACKGROUND

1. Related Applications

The subject matter disclosed in this application is related to subject matters disclosed in copending applications entitled, "PROJECTION DEVICE WITH BRIGHTNESS ADJUSTMENT FUNCTION AND METHOD THEREOF", filed Dec. 28, 2010 Ser. No. 12/980311; "PROJECTION DEVICE WITH BRIGHTNESS ADJUSTMENT FUNCTION AND METHOD THEREOF", filed Dec. 30,2010 Ser. No. 12/981563; "PROJECTION DEVICE WITH BRIGHTNESS ADJUSTMENT FUNCTION AND METHOD THEREOF", filed Dec. 30, 2010 Ser. No. 12/981562, and assigned to the same assignee as named herein.

2. Technical Field

The present disclosure relates to projection devices and, particularly, to a projection device having a brightness adjustment function and a method for the same.

3. Description of Related Art

In general, projection devices such as projectors are usually connected to an image output device, such as a video tape recorder or a VCD player. When the projection device projects images onto a projection surface in a room that is not dark enough, the images may look washed out.

DETAILED DESCRIPTION

Figure 1:
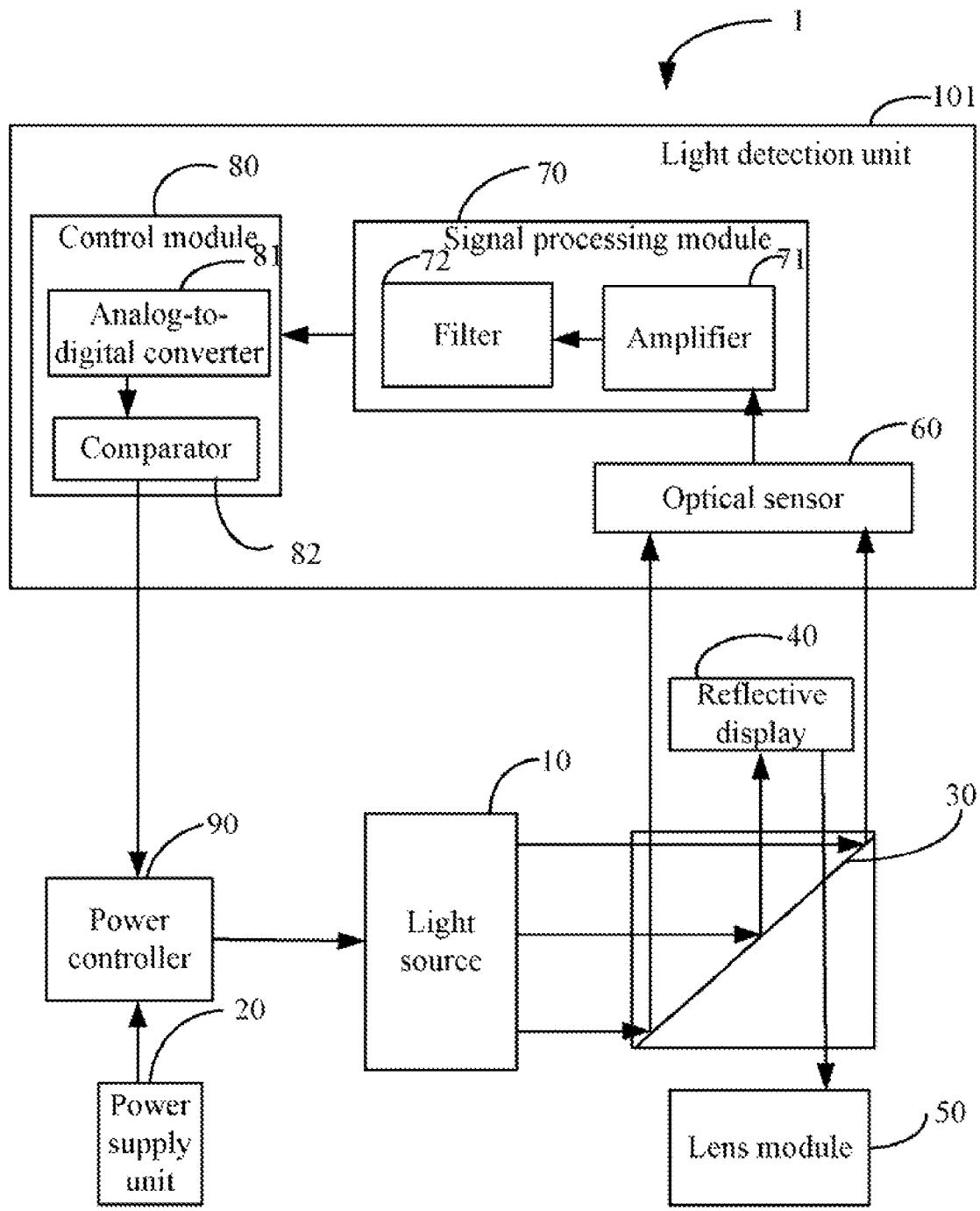
FIG. 1 is a block diagram of a hardware infrastructure of a projection device with a brightness adjustment function in accordance with an exemplary embodiment.

Referring to FIG. 1, a projection device 1 includes a light source 10, a power supply unit 20, a power controller 90, a polarization beam splitter (PBS) 30, a reflective display 40, a light detection unit 101 and a lens module 50.

The light source 10 emits light to the PBS 30. In one embodiment, the light source 10 may be an LED, or a RGB LED.

The power supply unit 20 supplies power to the light source 10 through the power controller 90, thereby controlling a digital value of the light from the light source 10.

The PBS 30 reflects a portion of the light from the light source 10 to the reflective display 40, and transmits a remaining portion of the light. The reflective display 40 displays images, receives the light reflected by the PBS 30, and reflects the received light to the PBS 30. The PBS 30 further transmits the light reflected by the reflective display 40 to the lens module 50. The lens module 50 projects the images to be displayed by the reflective display 40 onto a projection surface. During the reflection of the light on the reflective display 40, due to the fact that a covering area of the light reflected by the PBS 30 is greater than the area of the reflective display 40, a portion of the light reflected by the PBS 30 will not be received by the reflective display 40. In one embodiment, the reflective display 40 is a liquid crystal on silicon.

The light detection unit 101 acquires a digital value of the portion of the light reflected by the PBS 30 that is not received by the reflective display 40, and compares the digital value with a predetermined digital value to generate a control signal. In one embodiment, the light detection unit 101 includes an optical sensor 60, a signal processing module 70, and a control module 80. The optical sensor 60 senses the portion of the light reflected by the PBS 30 that is not received by the reflective display 40 to generate a sensing signal. In one embodiment, the optical sensor 60 is a micro-electro mechanical system (MEMS) sensor.

The signal processing module 70 includes an amplifier 71 and a filter 72. The amplifier 71 amplifies the sensing signal from the optical sensor 60. The filter 72 filters the amplified sensing signal to generate an analog signal.

The control module 80 includes an analog-to-digital converter 81 and a comparator 82. The analog-to-digital converter 81 converts the analog signal to a digital signal. The comparator 82 compares the converted digital signal with a predetermined digital signal to generate the control signal.

The power controller 90 adjusts power from the power supply unit 20 to the light source 10 according to the control signal until the digital value matches the predetermined digital value of light from the light source 10.

Figure 2:
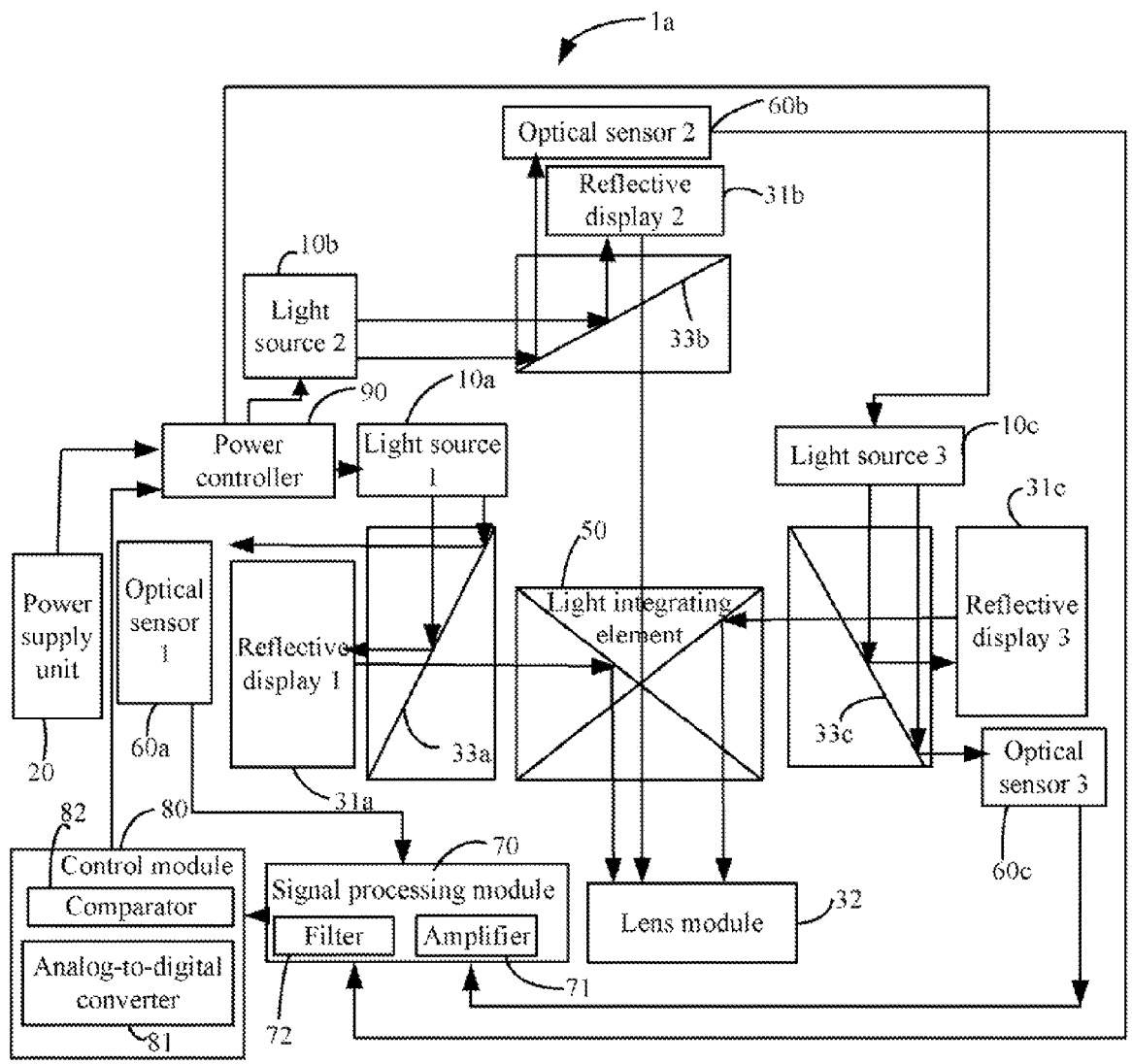
FIG. 2 is a block diagram of a hardware infrastructure of a projection device with a brightness adjustment function in accordance with another embodiment.

As shown in FIG. 2, in another embodiment of the disclosure, the projection device 1a includes three light sources 10a, 10b and 10c, three reflective displays 40a, 40b and 40c, three polarization beam splitter (3-PBS) 30a, 30b, and 30c, and a light integrating element 100. The three reflective displays 40a, 40b, and 40c respectively display the same images. In one embodiment, the three light sources 10a, 10b, and 10c are red light, green light, and blue light source, and respectively emit the light to the 3-PBS 30a, 30b, and 30c. The 3-PBS 30a, 30b, and 30c respectively reflect the portion of the light from the three light sources 10a, 10b, and 10c to the three reflective displays 40a, 40b, and 40c, and transmit the remaining portion of the light. The three reflective displays 40a, 40b, and 40c respectively receive the light reflected by the PBS 30, and reflect the light through the 3-PBS 30a, 30b, and 30c to the three reflective displays 40a, 40b, and 40c. The light integrating element 100 is for integrating the images from the reflective displays 40a, 40b, and 40c to the lens module 50.

The light detection unit 101 includes three optical sensors 60a, 60b, and 60c, which respectively sense the portion of the light reflected by the 3-PBS 30a, 30b, and 30c that is not received by the three reflective displays 40a, 40b, and 40c to generate three sensing signals.

The signal processing module 70 amplifies and filters the three sensing signals to generate three corresponding analog signals. The control module 80 converts the three analog signals to three digital signals, and respectively compares the three digital signals with the predetermined digital signal to generate three control signals. The power controller 90 adjusts power from the power supply unit 20 to the three light sources 10a, 10b, and 10c according to the three control signals until the digital value respectively matches the predetermined digital value of the light from the three light sources 10a, 10b, and 10c.

Figure 3:
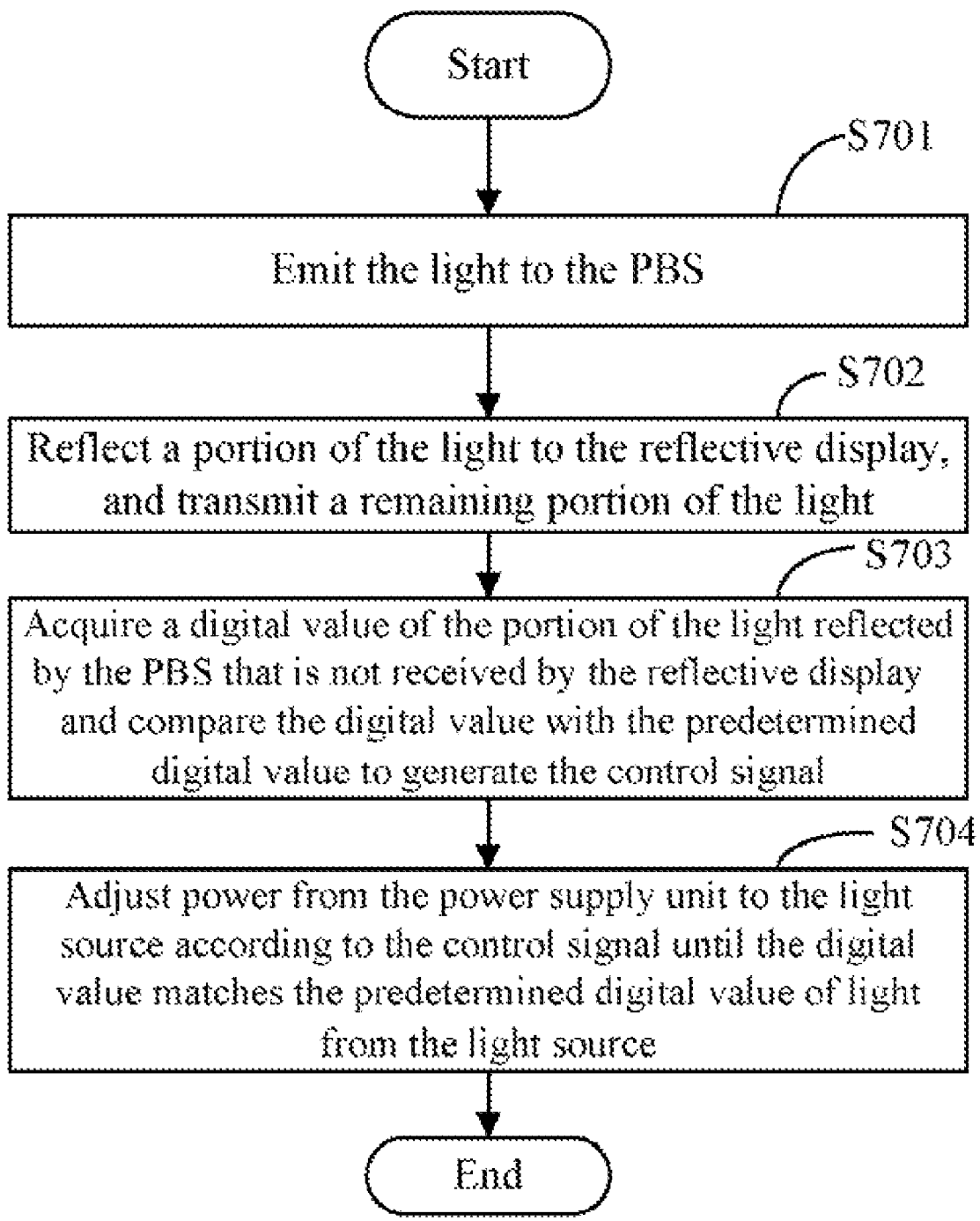
FIG. 3 is a flowchart of a method having a brightness adjustment function implemented by the projection device of FIG. 1, in accordance with an exemplary embodiment.

FIG. 3 is a flowchart of a method having a brightness adjustment function implemented by the projection device of FIG. 1, in accordance with an exemplary embodiment.

In step S701, the light source 10 emits the light to the PBS 30.

In step S702, the PBS 30 reflects the portion of the light from the light source 10 to the reflective display 40, and transmits the remaining portion of the light.

In step S703, the light detection unit 101 acquires a digital value of the portion of the light reflected by the PBS that is not received by the reflective display 40, and compares the digital value with the predetermined digital value to generate the control signal.

In step S704, the power controller 90 adjusts power from the power supply unit 20 to the light source 10 according to the control signal until the digital value matches the predetermined digital value of light from the light source 10.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A projection device with a brightness adjustment function comprising:
    a polarization beam splitter (PBS);
    a light source for emitting light to the PBS;
    a reflective display;
    the PBS for reflecting a portion of the light to the reflective display, and transmitting a remaining portion of the light;
    the reflective display for receiving the portion of the light reflected by the PBS, and reflecting the received light to the PBS;
    a lens module for projecting the images to be displayed by the reflective display;
    the PBS further for transmitting the light reflected by the reflective display to the lens module;
    a power supply unit for supplying power for the light source;
    a light detection unit for acquiring a digital value of a portion of the light reflected by the PBS that is not received by the reflective display, and comparing the digital value with a predetermined digital value to generate a control signal; and
    a power controller for adjusting power from the power supply unit to the light source according to the control signal until the digital value matches the predetermined digital value of the light from the light source.

2. The projection device as described in claim 1, wherein the reflective display is a liquid crystal on silicon.

3. The projection device as described in claim 1, wherein the light source is an LED or a RGB LED.

4. A projection device with a brightness adjustment function comprising:
    three polarization beam splitters (3-PBS);
    three light sources for respectively emitting light to the 3-PBS;
    three reflective displays for displaying the same images;
    the 3-PBS for respectively reflecting a portion of the light to the three reflective displays, and transmitting a remaining portion of the light;
    the three reflective displays for respectively receiving the portion of the light reflected by the 3-PBS, and reflecting the received light to the 3-PBS;
    a lens module for projecting the images to be displayed by the three reflective displays;
    the 3-PBS further for respectively transmitting the light reflected by the three reflective displays to the lens module;
    a power supply unit for supplying power for the three light sources;
    a light detection unit for acquiring a digital value of a portion of the light reflected by the 3-PBS that is not received by the three reflective displays, and comparing the digital value with a predetermined digital value to generate three control signals; and
    a power controller for adjusting power from the power supply unit to the three light sources according to the three control signals until the three digital values respectively match the predetermined digital value of the light from the light source.

5. The projection device as described in claim 4, wherein the three light sources are red light, green light and blue light source.

6. The projection device as described in claim 4, further comprising:
    a light integrating element which is used for integrating the images from the three reflective displays to the lens module.

7. A method with a brightness adjustment function implemented by a projection device; wherein the projection device comprises a light source, a polarization beam splitter (PBS); power supply unit, and reflective display, the method comprising:
    emitting light to the PBS;
    acquiring a digital value of a portion of the light reflected by the PBS that is not received by the reflective display, and comparing the digital value with a predetermined digital value to generate a control signal; and
    adjusting power from the power supply unit to the light source according the control signal until the digital value matches the predetermined digital value of the light from the light source.

* * * * *